United States Patent
Snitkovskiy et al.

(10) Patent No.: US 8,694,322 B2
(45) Date of Patent: Apr. 8, 2014

(54) SELECTIVE CONFIRMATION FOR EXECUTION OF A VOICE ACTIVATED USER INTERFACE

(75) Inventors: Alex G. Snitkovskiy, Bellevue, WA (US); David Mowatt, Dublin (IE); Felix G. T. I. Andrew, Seattle, WA (US); Robert Edward Dewar, Bellevue, WA (US); Oliver Scholz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1995 days.

(21) Appl. No.: 11/256,120

(22) Filed: Oct. 21, 2005

(65) Prior Publication Data

US 2007/0033054 A1 Feb. 8, 2007

Related U.S. Application Data

(60) Provisional application No. 60/705,973, filed on Aug. 5, 2005.

(51) Int. Cl.
*G10L 21/06* (2013.01)
*G10L 15/00* (2013.01)

(52) U.S. Cl.
USPC .......... 704/275; 704/270; 704/273; 704/251; 704/E17.011

(58) Field of Classification Search
USPC ................. 704/275, 251, E17.016, 273, 270, 704/E17.011
See application file for complete search history.

(56) References Cited

U.S. PATENT DOCUMENTS

| | | | |
|---|---|---|---|
| 5,802,467 A * | 9/1998 | Salazar et al. | 455/420 |
| 5,890,122 A | 3/1999 | Van Kleeck et al. | 704/275 |
| 5,930,751 A * | 7/1999 | Cohrs et al. | 704/231 |
| 6,012,030 A | 1/2000 | French-St. George et al. | 704/275 |
| 6,052,666 A * | 4/2000 | Diehl et al. | 704/275 |
| 6,278,975 B1 | 8/2001 | Brant et al. | 704/275 |
| 6,289,140 B1 | 9/2001 | Oliver | 382/313 |
| 6,456,974 B1 | 9/2002 | Baker | |
| 6,466,847 B1 * | 10/2002 | Horst | 701/2 |
| 6,505,155 B1 | 1/2003 | Vanbuskirk et al. | 704/246 |
| 6,882,974 B2 | 4/2005 | James | |
| 6,937,984 B1 * | 8/2005 | Morgan et al. | 704/270 |
| 6,965,863 B1 | 11/2005 | Zuberec et al. | 704/270 |
| 7,039,590 B2 * | 5/2006 | Luchaup | 704/275 |
| 7,206,747 B1 * | 4/2007 | Morgan et al. | 704/275 |
| 7,516,077 B2 * | 4/2009 | Yokoi et al. | 704/275 |
| 7,899,673 B2 * | 3/2011 | Brown | 704/270 |
| 2002/0077830 A1 * | 6/2002 | Suomela et al. | 704/275 |

(Continued)

FOREIGN PATENT DOCUMENTS

WO    WO 2005/036786    4/2005

OTHER PUBLICATIONS

Microsoft Outlook 2003.*

(Continued)

*Primary Examiner* — Pierre-Louis Desir
*Assistant Examiner* — Abdelali Serrou
(74) *Attorney, Agent, or Firm* — Sung Kim; Andrew Sanders; Mickey Minhas

(57) ABSTRACT

A voice-activated user interface for an application is described. The voice activated user interface invokes a speech recognition component to recognize audio input from a user. If the audio input is a command, then a validation component is invoked to determine whether to validate the command prior to execution.

19 Claims, 4 Drawing Sheets

(56) References Cited

U.S. PATENT DOCUMENTS

| | | | |
|---|---|---|---|
| 2003/0235276 A1* | 12/2003 | Tateishi et al. | 379/88.01 |
| 2004/0230637 A1 | 11/2004 | Lecoueche et al. | 709/200 |
| 2005/0049862 A1* | 3/2005 | Choi et al. | 704/231 |
| 2005/0059432 A1 | 3/2005 | Choi | |
| 2005/0125270 A1 | 6/2005 | Davis et al. | 705/7 |
| 2005/0179684 A1 | 8/2005 | Wallace | 345/419 |
| 2005/0216268 A1 | 9/2005 | Kannappan | 704/270 |

OTHER PUBLICATIONS

"The First Office Action (PCT Application in the National Phase)" for Application No. 200680028639.4, The Patent Office of the State Intellectual Property Office of the People's Republic of China; Date of Dispatch Aug. 7, 2009; 17 pages.

"Application of the Universal Access Copier System for Blind and Visually Impaired Persons", Eghtesadi et al., 4 pages, http://www.csun.edu/cod/conf/2000/proceedings/0232Eghtesdai.htm, from year 2000 conference.

"Voice Recognition and Voice Output", 3 pages, http://www.digitalskyvoice.com/whatisvoice.htm, Jan. 25, 2006.

"Spatial Auditory User Interfaces" by Veronika Putz, Diploma Thesis, Institute of Electronic Music, University of Music and Dramatic Arts Graz and Graz University of Technology, Erzherzog-Johann University; Oct. 2004, 111 pages.

"Written Opinion" from related file from the Australian Patent Office for Application No. SG200800942-5, filed Aug. 7, 2006; 5 pages.

European Patent Application No. 06 789 549.0 Communication Pursuant to Rule 70(2) and 70(a)(2), dated Feb. 9, 2011, 1 page.

PCT Application No. PCT/US2006/030811 Search Report and Written Opinion dated Dec. 15, 2006, 11 pages.

Australian Patent Application No. SG200800942-5 Written Opinion dated Feb. 13, 2009, 5 pages.

Chinese Patent Application No. 200680028639.4 Second Office Action mailed Dec. 14, 2010. 8 pages.

European Patent Application No. 06 789 549.0 Office Action dated Apr. 5, 2012, 5 pages.

Chinese Patent Application No. 200680028639.4 Decision on Rejection dated Jul. 4, 2012 16 pages.

\* cited by examiner

SELECTIVE CONFIRMATION FOR EXECUTION OF A VOICE ACTIVATED USER INTERFACE

This application claims priority to Provisional application Ser. No. 60/705,973, filed Aug. 5, 2005.

BACKGROUND

Speech recognition applications recognize speech and generate text and/or execute commands based upon the recognized speech. Speech recognition is prone to error and as a result, the wrong text is occasionally displayed or the wrong command is occasionally executed.

The discussion above is merely provided for general background information and is not intended to be used as an aid in determining the scope of the claimed subject matter.

SUMMARY

A voice-activated user interface ("UI") which selectively validates commands prior to execution. A speech recognition component is invoked to recognize speech input from a user. If the speech input is a command, then a validation component is invoked to determine whether to validate the command. Depending upon the input command, the validation component prompts the user to confirm or validate that the user wishes to execute the input command.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter

DETAILED DESCRIPTION OF ILLUSTRATIVE EMBODIMENTS

Figure 1:
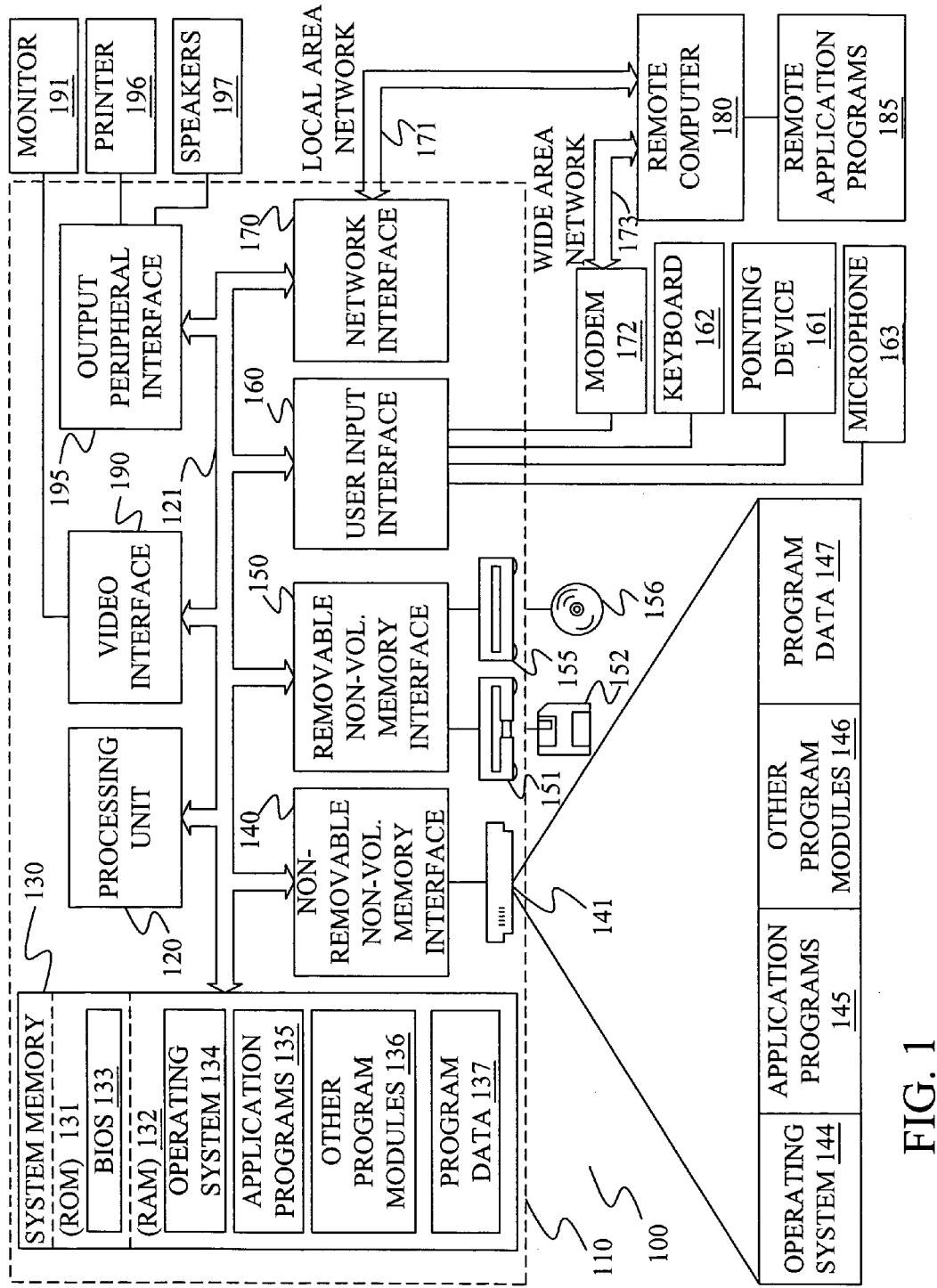
FIG. 1 is a block diagram of one computing environment in which the present invention may be practiced.

FIG. 1 illustrates an example of a suitable computing system environment 100 on which embodiments may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
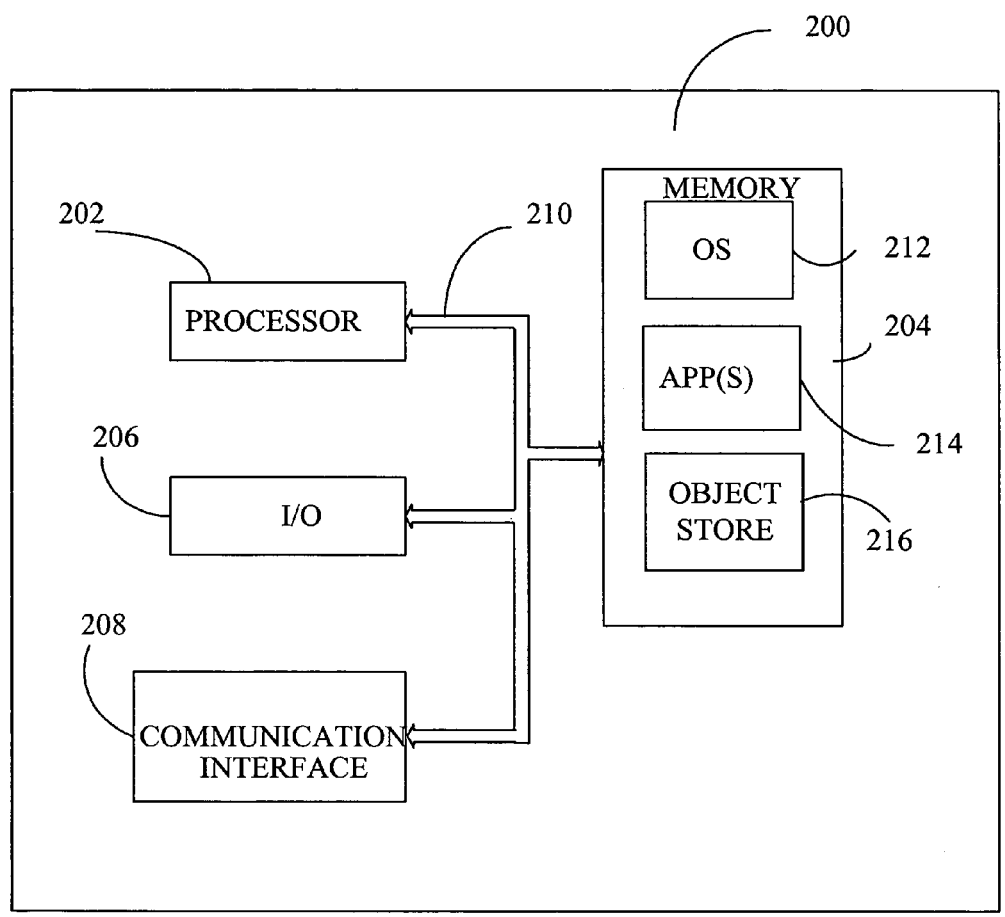
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. In an illustrative embodiment, a portion of memory 204 is allocated as addressable memory for program execution, while another portion of memory 204 is used for storage, such as to simulate storage on a disk drive.

Memory 204 includes an operating system 212, application programs 214 as well as an object store 216. During operation, operating system 212 is executed by processor 202 from memory 204. Operating system 212, in one embodiment, is a WINDOWS® CE brand operating system commercially available from Microsoft Corporation. Operating system 212 is designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Figure 3:
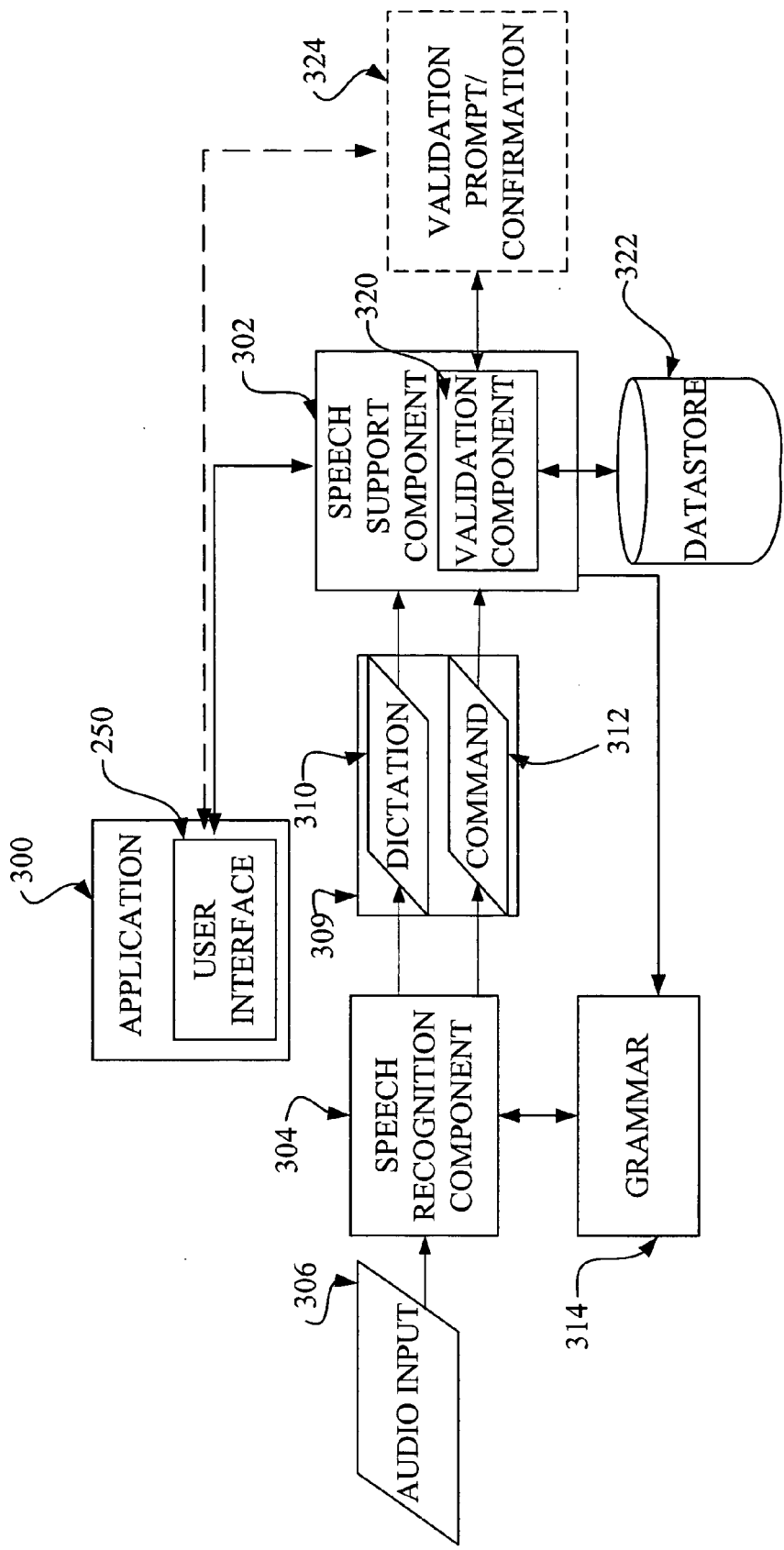
FIG. 3 is a block diagram of an embodiment of a voice activated user interface which includes a validation component for application commands.

FIG. 3 illustrates a system that allows for voice activation of a user interface 250 for application 300. As shown in FIG. 3, the system includes a speech support component 302. Speech support component 302 is configured to invoke a speech recognition component 304 which receives audio input 306 from a user, for example through a microphone or other speech input device, and decodes the speech to identify text 309 which consists of dictation 310 and/or commands 312. Examples of dictation 310 include text for the body of a word processing document and/or the body of an e-mail message.

Commands 312 include instructions to perform tasks such as "send", "print", "delete" or "save". Speech support component 302 inspects user interface 250 to determine what elements are displayed on the interface and the labels associated with each element. Based upon the labels and the elements of the interface, speech support component 302 builds a grammar 314 which is used by the speech recognition component 304 to designate certain recognized words and phrases as commands. Typically, the grammar 314 will define a rule for a command such that the command is found between a leading pause of silence and a trailing pause of silence.

Speech support component 302 invokes a validation component 320 to validate the command 312 prior to executing the command 312 through user interface 250. The validation component 320 can be a separate object module or can be integrated with speech support component 302.

The validation component 320 can use different validation techniques to validate the input command 312. One such technique compares the input command 312 to a list of destructive monosyllabic commands in a data store 322. Destructive commands are commands that cannot be easily undone. For example, the command "send" is monosyllabic and is considered destructive because in many e-mail systems, the e-mail document cannot be unsent after the send command has been executed. Monosyllabic commands, such as "send", are chosen for validation because they are prone to misrecognition. Since validation requires user input, it is desirable to limit validation to only those cases where misrecognition is likely. The present inventors have discovered that misrecognition is much more likely for monosyllabic words and as such, under one embodiment, validation is only performed for monosyllabic commands.

If the input command 312 is one of the destructive commands in data store 322, then the validation component 320 will prompt the user as illustrated by block 324 to confirm that the user wishes to proceed. For example, if the user is creating an e-mail message and utters the word "send", the validation component 320 would prompt the user to confirm that the user wishes to send the e-mail.

The validation prompt or message 324 can be displayed or implemented through the user interface 250 of the application program 300. The validation prompt can be implemented in different forms. For example, an audio prompt or text prompt can be used.

In one embodiment, the user is prompted to confirm the command 312 by visually highlighting a button or icon on a computer display or screen that corresponds to the command. The user then confirms that the user wants to execute the highlighted command. The user can confirm the highlighted command by using a yes/no feedback option. Alternatively, the application 300 can display a message that the application 300 will execute the command following a time delay unless the user instructs the application or program to the contrary.

Figure 4:
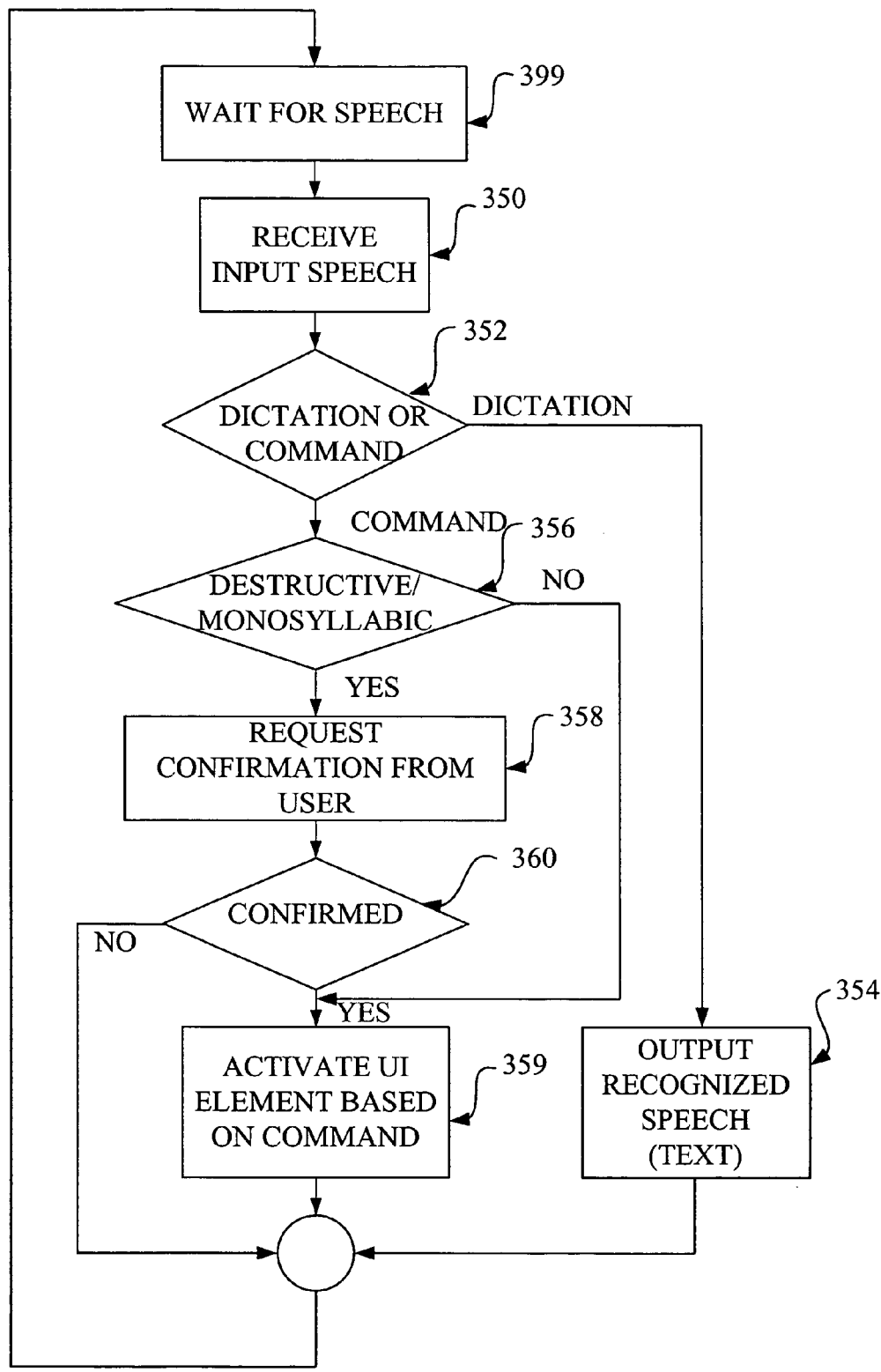
FIG. 4 is a flow diagram illustrating one embodiment for implementing a voice activated user interface according to the present invention.

FIG. 4 is a flow chart illustrating steps for implementing a voice activated interface for a computer application or program. As shown, the speech support component 302 invokes a speech recognition component 304 to receive input speech as shown in step 350. The speech recognition component 304 determines whether the input speech is dictation or an application command in step 352.

Text and commands are distinguished based upon attributes of the input speech and based upon the grammar 314 of application commands. For example, the distinguishing attributes of a command can include leading and trailing pauses separating the command from the rest of the utterance.

However, in another embodiment, free form speech dictation can be used and command confirmation or validation still employed.

If the recognized speech is dictation then the text is placed in a currently active user interface element of user interface 250 as illustrated by step 354.

If the recognized speech is a command, then the validation component 320 determines if the command is destructive or non-destructive, or whether to request confirmation as illustrated by step 356.

In the illustrated embodiment, if the command is destructive, then confirmation is requested from the user as illustrated by block 358. If the command is not destructive, then the command is converted into the selection of a user interface element and a call to the selection method is made at step 359.

As shown in step 360, if the destructive command is confirmed by the user, then the command is converted into the selection of a user interface element at step 359. Otherwise, if the user does not confirm the command, the command is not executed. The process waits for the next speech input as illustrated in step 399.

The validation component 320 uses the list of commands in the data store 322 to selectively request confirmation prior to executing the command. Using the data store to identify destructive or monosyllabic commands for confirmation prior to execution reduces misrecognition and execution of unintended tasks or functions.

A list of destructive commands can be manual input into the data store 322. For example, the destructive commands can be entered without user input. In another embodiment, data store 322 records are generated based upon feedback from the user. In a further embodiment, the end user can configure the application (even while the application is running) to modify the list of destructive words in the data store 322. For example, if the speech recognition component 304 outputs the command "run", but the user did not utter or intend the "run" command, the user can provide feedback to the application indicating that there was a recognition error. Specifically the user can indicate that the command "run" should not have been executed and that the "run" command must be validated in the future. This command is then added to the data store 322 so that the user is prompted prior to execution of the command in the future.

In an illustrative embodiment, applications, themselves can populate the data store 322 with a list destructive commands. This can be done in several ways. In accordance with one way, when the application is installed, the application populates a list of destructive commands to the data store 322.

In accordance with another way, the application dynamically marks certain elements in the user interface 250 as destructive. Thus, when the speech support component 302 interfaces with the application 300 to determine the elements or interface commands displayed, the speech support component 302 can also determine which command or commands are destructive. For example in one interface or application, when the user utters "red" (for a red flag), "red" is marked as destructive, and a confirmation step is used to confirm execution of the speech command or utterance. In a different part of the same application or a different application, "red" can merely change the text color, and thus, "red" is not marked as destructive and no confirmation step is used.

Information regarding the instances in which commands are destructive can be embedded in the list of destructive commands. For example, "send/all applications" denotes that the "send" command is destructive for all applications, while "red/alertmonitor" denotes that "red" is destructive for the application called "alertmonitor" only.

Thus, in illustrative embodiments, the data store 322 can be a static store or alternatively, the data store 322 can be dynamically populated and application is not limited to a particular embodiment described.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system comprising:
    a processor;
    a computer readable storage media storing instructions which, when executed by the processor, configure the computer system to:
        identify a plurality of user selectable tasks or functions for one or more active applications or components;
        provide a grammar corresponding to the plurality of user selectable tasks or functions;
        recognize, using the grammar, a received audio command corresponding to implementation of a particular one of the plurality of user selectable tasks or functions;
        access information in a data store separate from the grammar, wherein said information includes a list of commands and identifies, for each of the commands in the list of commands, one or more of the plurality of user selectable tasks or functions for which the command should be validated, and wherein at least one command in the list of commands has a first one of the user selectable tasks or functions for which the command is to be validated and the same at least one command has a second one of the user selectable tasks or functions for which the command is not to be validated;
        output a validation prompt to request validation if the audio command matches at least one command in the data store and the information in the data store indicates that the at least one matched command should be validated.

2. The system of claim 1 wherein the data store includes a list of destructive commands.

3. The system of claim 2 wherein all commands in the list of commands are monosyllabic.

4. The system of claim 1 wherein the instructions configure the computer system to:
    invoke a user interface to output the validation prompt to the user to confirm execution of the audio command.

5. The system of claim 1 wherein the instructions configure the computer system to:
    output one of an audio prompt or text prompt to confirm implementation of the audio command.

6. The system of claim 1 and further comprising an audio input device, wherein the instructions configure the computer system to:
    recognize the audio command from an audio input from the audio input device.

7. A hardware computer readable storage medium storing instructions which, when implemented by a computer, perform a method comprising:
    displaying a user interface for an active application that includes one or more user selectable tasks or functions;
    receiving an audio input from an audio input device and outputting an audio command corresponding to a user selected task or function of the active application;
    recognizing the audio command corresponding to the user selected task or function; and
    receiving the audio command and identity of the active application and retrieving, from a validation data store, a list of commands and information identifying one or more applications of a plurality of different applications in which each of the commands requires validation, wherein at least one command in the list of commands has a first application for which the command is to be validated and the same at least one command has a second application for which the command is not to be validated;
    determining whether the audio command requires validation by comparing the audio command to the list of commands and comparing the identity of the active application to the information retrieved from the validation data store identifying the one or more applications; and
    outputting a validation prompt or request to the user if the audio command requires validation.

8. The hardware computer readable storage medium of claim 7 wherein the data store includes a list of destructive commands requiring validation.

9. The hardware computer readable storage medium of claim 8 wherein all of the destructive commands of the data store are monosyllabic.

10. The hardware computer readable storage medium of claim 7, the method comprising prompting the user to confirm implementation of the audio command if the audio command requires validation.

11. A computer implementable method comprising:
    providing a user interface for an active application or component;
    receiving audio input from an audio input device;
    using a speech recognition component to recognize a user command from the audio input to implement a given task or function of the user interface;
    accessing a data store having a plurality of records, each record pertaining to a particular command and identifying for the particular command one or more tasks or functions for which the particular command should be validated, wherein the data store identifies that the recognized user command requires validation for a first task or function and the same recognized user command does not require validation for a second task or function of the user interface;
    identifying, using a computer processor, a record of the plurality of records pertaining to the recognized user command and determining whether to validate the recognized user command based on the record; and
    outputting a validation option for the recognized user command if the recognized user command requires validation.

12. The method of claim 11 wherein the plurality of records in the data store comprise monosyllabic commands.

13. The method of claim 11 and comprising:
    receiving input in response to a "yes" and "no" validation option to confirm execution of the user command.

14. The method of claim 11 wherein the output validation option is one of an audio or text prompt.

15. The method of claim 11 and further comprising:
generating a data store record for a command requiring validation based upon feedback from a user.

16. The method of claim 11 and further comprising:
using an application to dynamically populate the data store with the commands requiring validation for the application.

17. The hardware computer readable storage medium of claim 7, the method comprising providing a grammar to the speech recognition component separate from the validation store wherein the grammar includes words or phrases associated with the one or more user selectable tasks or functions of the user interface.

18. The method of claim 11 and comprising:
generating a grammar for the speech recognition component utilizing tasks or functions of the user interface for the active application or component; and
using the grammar to recognize the user command from the audio input.

19. The hardware computer readable storage medium of claim 7 wherein the command in the validation data store include one command that requires validation in one instance and another command that requires validation in a different instance.

* * * * *